United States Patent [19]

Hagenlocher et al.

[11] Patent Number: 5,110,070
[45] Date of Patent: May 5, 1992

[54] RIGID AIRSHIP HAVING RIBS AND LONG BEAMS FORMING A CARRIER FRAME

[75] Inventors: Klaus Hagenlocher, Friedrichshafen; Florian Windischbauer, Lindau, both of Fed. Rep. of Germany

[73] Assignee: Luftschiffbau Zeppelin GmbH, Friedrichshafen, Fed. Rep. of Germany

[21] Appl. No.: 712,269

[22] Filed: Jun. 7, 1991

[30] Foreign Application Priority Data

Jun. 12, 1990 [DE] Fed. Rep. of Germany ....... 4018749

[51] Int. Cl.⁵ .............................................. B64B 1/06
[52] U.S. Cl. ..................................... 244/125; 244/30
[58] Field of Search ................ 244/125, 126, 128, 131, 244/24, 25, 30

[56] References Cited

U.S. PATENT DOCUMENTS

| | | | |
|---|---|---|---|
| 1,007,405 | 10/1911 | Wagner et al. | 244/125 |
| 1,191,077 | 7/1916 | Hermanson | 244/125 |
| 1,648,935 | 11/1927 | Campau | 244/125 |
| 2,083,051 | 6/1937 | Chapas | 244/125 |

FOREIGN PATENT DOCUMENTS

| | | |
|---|---|---|
| 224322 | 6/1909 | Fed. Rep. of Germany . |
| 241365 | 9/1910 | Fed. Rep. of Germany . |
| 314846 | 11/1912 | Fed. Rep. of Germany . |
| 303909 | 5/1922 | Fed. Rep. of Germany . |
| 405563 | 11/1924 | Fed. Rep. of Germany . |
| 462697 | 6/1928 | Fed. Rep. of Germany . |
| 475985 | 4/1929 | Fed. Rep. of Germany . |
| 520664 | 2/1931 | Fed. Rep. of Germany . |
| 610976 | 2/1935 | Fed. Rep. of Germany . |
| 657909 | 3/1938 | Fed. Rep. of Germany . |
| 1531350 | 2/1970 | Fed. Rep. of Germany . |
| 1781416 | 4/1972 | Fed. Rep. of Germany . |
| 509501 | 11/1920 | France . |
| 49829 | 11/1909 | Switzerland . |
| 123604 | 3/1919 | United Kingdom . |
| 211334 | 2/1924 | United Kingdom . |

OTHER PUBLICATIONS

"Vergleichende Strukturuntersuchungen an Luftschiffmodellen" p. 161 etc. of convention Flugsysteme leichter als Luft of Mar. 1976. The article is by Institut fuer Statik und Dynamic der Luft-und Raumfahrtkonstruktionen an der Univ Stuttgart.

Article entitled: "AD-500: the commercial airship"; pp. 539-544, Flight Internationa., Feb. 24, 1979.

Primary Examiner—Joseph F. Peters, Jr.
Assistant Examiner—Virna Lissi Mojica
Attorney, Agent, or Firm—W. G. Fasse

[57] ABSTRACT

A rigid airship has a carrier frame with triangular cross-ribs interconnected by longitudinal beams, one connectd to each corner of the triangle. Thus, prism-type frame sections are formed which are stiffened by diagonal tensioning members (D). The prism of each frame section (A) has two lateral sides and a base side. Each of the three sides is stiffened with two diagonal tensioning members. Junctions between neighboring frame sections are formed at the triangle corners. Carrier gas cells, the skin of which forms at least part of the airship skin, are secured in the frame sections. The base of each triangle cross-rib forms the base of the frame. One or more air chambers are formed in the belly of the airship below the base of the frame.

20 Claims, 10 Drawing Sheets

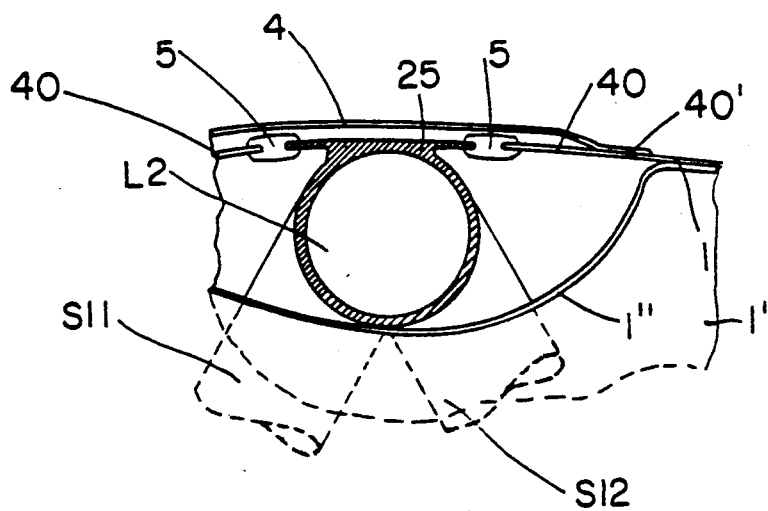
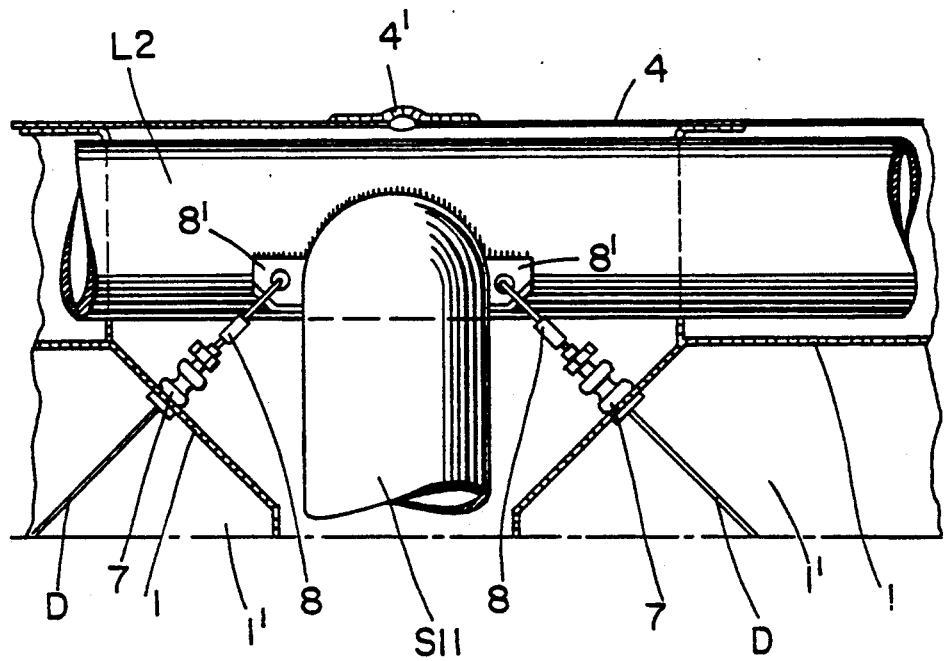
FIG. 5b

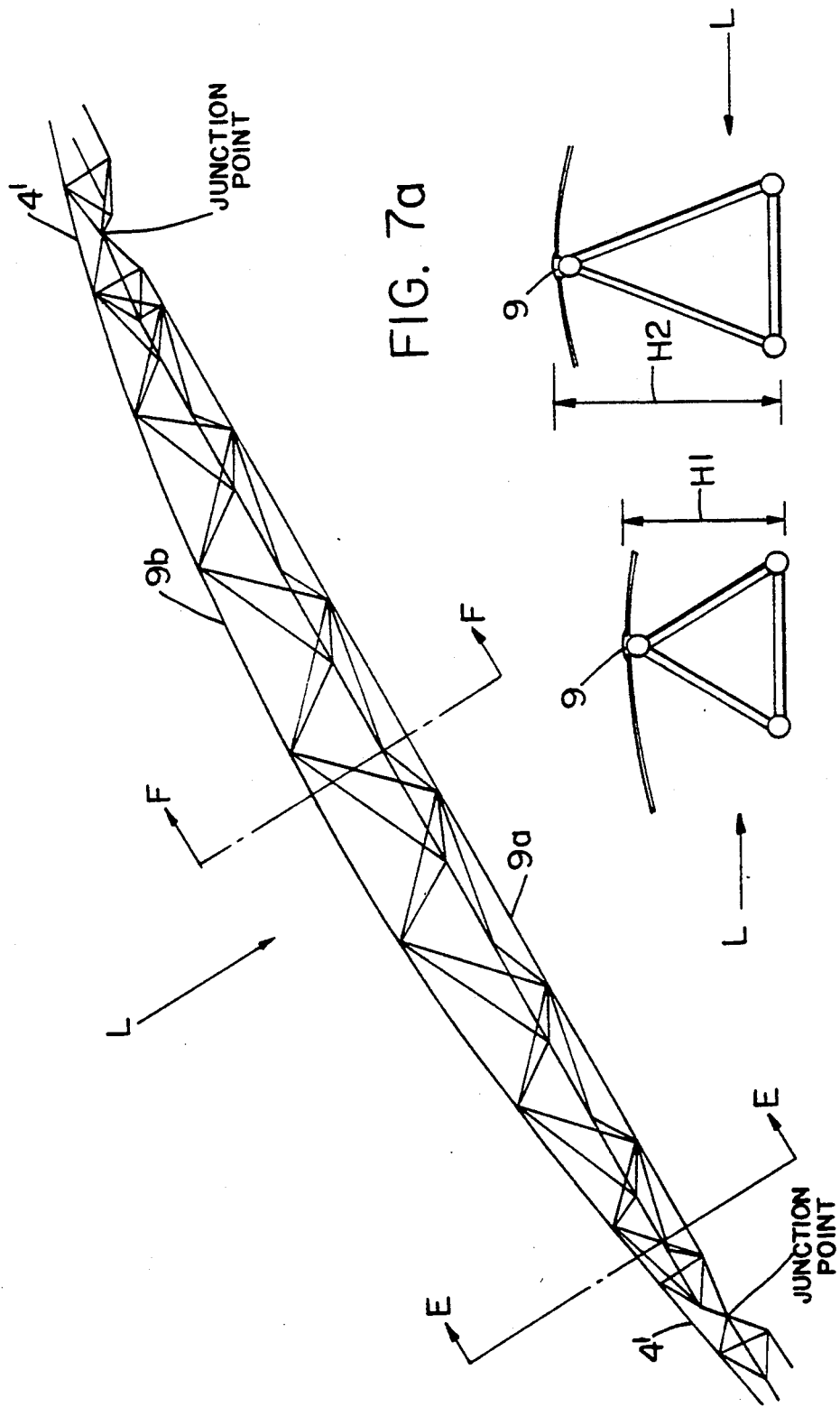

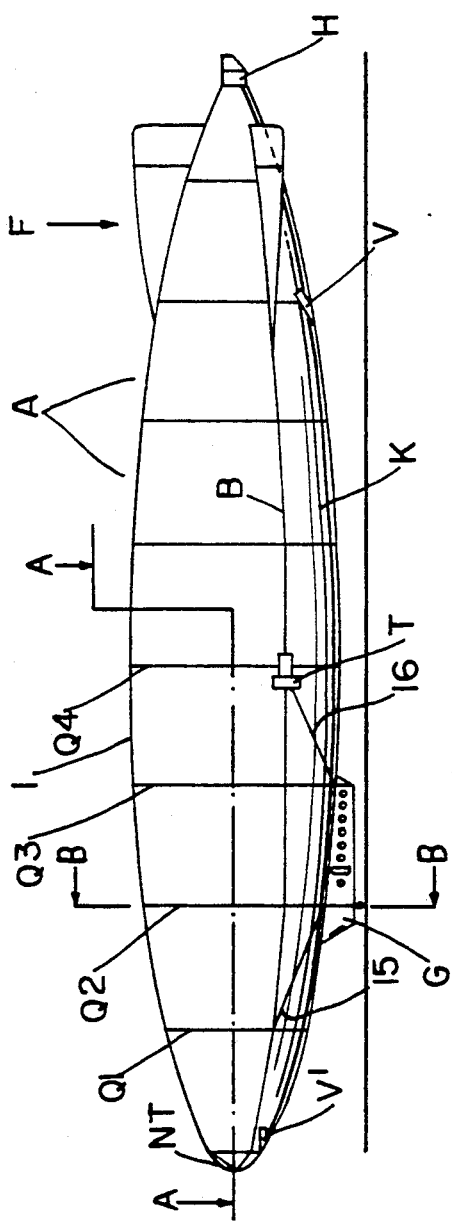
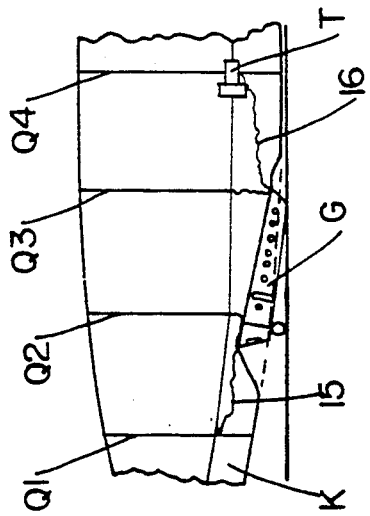
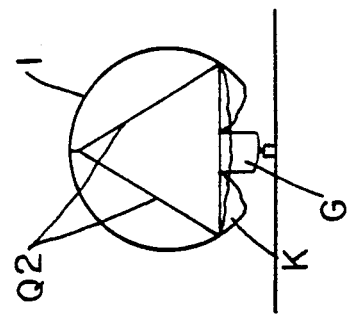
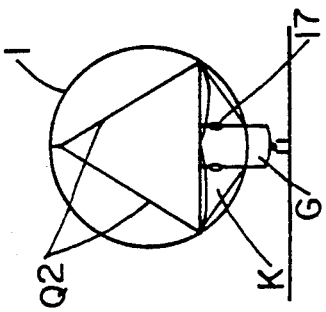
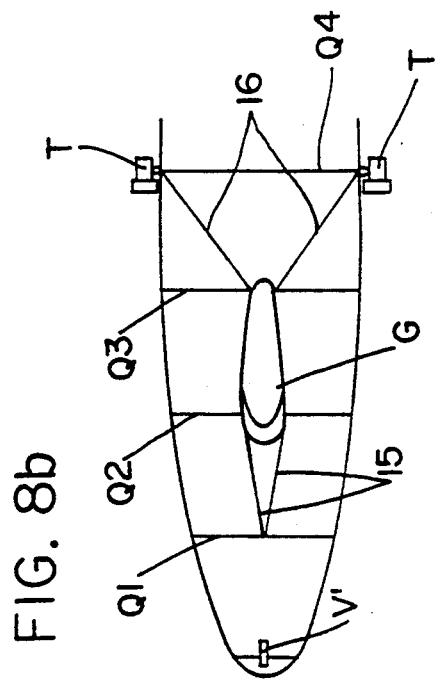

RIGID AIRSHIP HAVING RIBS AND LONG BEAMS FORMING A CARRIER FRAME

THE INVENTION

The invention relates to a rigid airship with a carrier frame formed of cross-ribs interconnected by long beams. A plurality of cross-ribs is interconnected by long beam sections interposed between neighboring cross-ribs. The so-formed carrier frame supports the lift producing carrier or lift gas cells and any other structural groups needed for the operation of the airship.

BACKGROUND INFORMATION

Airships of this type are referred to as rigid airships in contrast to so-called nonrigid or pressure airships. The pressure airships have only a single carrier gas cell and do not require a carrier frame. Advances made in the aircraft construction lead to the transport of passengers and goods primarily by aircraft in recent decades. However, there are special fields where the high transport speed of aircrafts is not especially important so that airships could be advantageously used in these special fields. It is, for example, advantageous when an aircraft is capable of cruising for prolonged periods of time in the vicinity of its destination at very low speeds, or even better, if it is capable to remain in a floating or rather, hovering, state for a longer period of time in a fixed location. Incidentally, in this context the term "aircraft" is intended to include airships. Airships are well capable of satisfying these requirements. Thus, repeated investigations have been made with regard to the use of airships. In actual practice, frequently the above mentioned pressure airships, also known as blimps, have been used. These blimps are somewhat smaller in volume and less expensive than conventional rigid airships. Due to avoiding a carrier frame, the blimps are not only lighter, but correspondingly less complicated in their construction and hence less expensive in their manufacture. Another advantage of blimps is the fact that even if they are relatively small, they still can carry a satisfactory payload. However, it is a disadvantage of blimps that their travel speed is rather low due to their plump shape. Another disadvantage is seen in that blimps are not very stable on their course and there is always the problem of gas leakage. When a blimp loses pressure, it is no longer effectively steerable.

Conventional rigid airships normally comprise a carrier frame made of a substantial number of ring-type cross ribs interconnected at junction points by a plurality of longitudinal beams. The ring-type cross-ribs are constructed as polygons comprising, for example, more than twenty cross-rib sections, whereby for satisfying strength requirements each corner of such a polygonal rib is connected with each other corner of the same ring-type rib by tension wires. At the corners of the ring-type ribs junction points are provided for the connection of the mentioned longitudinal beams. These junction points constitute the connection between any given ring to its neighboring rings. The so constructed multi-cornered sections of the carrier frame support the gas cells within the framework. The outer surface of the framework is closed by the so-called outer skin. The lift producing gas cells are held in place inside the framework by netting so that the lift gas cells bear against the inner surfaces of the frame members, whereby an intermediate space is formed between the skin of the individual gas cells and the outer skin of the airship. The frame members are arranged in this intermediate spacing which is lost for producing lift.

The individual cross rib sections of the rib rings and the longitudinal beams are conventionally constructed as a truss or framework. Such a construction involves a substantial technical effort and expense for the formation of the carrier frame. Another disadvantage of a truss-type carrier frame is seen in that it is sensitive against localized force introduction and against vibrations. Thus, even minor accidents may lead to substantial damage of the carrier frame structure which in turn entails a substantial effort and expense for maintenance and repair work. It should also be mentioned in this context that due to the weight of the carrier frame only relatively large rigid airships having a lift volume of several ten thousandths cubic meters, provide a satisfactory payload. However, airships of such sizes are not desirable for many purposes.

The above mentioned drawbacks of rigid airships must be contrasted to a few advantageous characteristics of such rigid airships. For example, due to the aerodynamically advantageous outer contour of rigid airships, they have a higher operational speed and a good course stability as compared to blimps. Another important advantage of rigid airships is their larger safety due to the use of a plurality of gas cells and due to the fact that gas loss is usually limited to one or only a few gas cells. Further, the rigid airship retains its contour and hence remains completely steerable.

A report entitled: "Flight Systems Lighter Than Air", published in March 1976 by the DGLR-Committe 2A6 contains a section entitled: Comparative Structural Investigations of Airship Models, by the "institute for Static and Dynamic Air-and Spacecraft Constructions" of the University of Stuttgart, Federal Republic of Germany. The committee investigates the construction of a carrier frame for airships. The suggestion made in these investigations differentiaties itself from previous rigid airship constructions in that substantially all cross-components of the structure have been obviated. The cross-components have been replaced by a pretensioned, compression loaded outer skin. This type of construction as proposed by said committee provides sustantial weight savings as compared to previous rigid airships while permitting the same structural loading of the carrier frame. The omission of heavy cross-ribs also substantially simplifies the manufacturating operations.

The report refers to carrier frame structures that have been investigated in which instead of the cross-ribs, three beams are provided in the shape of a triangle standing on its tip. The outer skin of the airship is wrapped externally around the three carriers. Longitudinal carrier beam structures are connected to the corners of the three cross carriers. The longitudinal carrier beam constructions interconnect the cross-carrier ribs with each other in sections and sequentially. However, the longitudinal carrier members secured to the lower tip of the triangle are sensitive to damage. Structural details regarding the carrier gas cells and any other structural features of the airship are not provided in said report. The report merely shows that by a simplified triangular construction of the ribs of the carrier frame weight savings are possible.

OBJECTS OF THE INVENTION

In view of the foregoing it is the aim of the invention to achieve the following objects singly or in combination:

to construct an airship that combines the undeniable advantages of the rigid airship with those of the blimp, while simultaneously avoiding the disadvantages of both;

to construct a rigid airship that has an optimally light carrier frame and a high payload as well as a substantial strength;

to provide a rigid airship that can be manufactured by simpler means and hence requires a smaller technical effort and expense than was necessary heretofore; and to provide relatively small rigid airships at relatively low manufacturing costs, whereby the skin of the carrier gas cells shall also form the envelope or skin of the airship or most of that envelope.

SUMMARY OF THE INVENTION

The above objects have been achieved according to the invention in a rigid airship that is characterized by the following features. The base of the triangular cross-ribs is arranged horizontally in a lower portion of the carrier frame of the airship. The longitudinal frame sections are formed by quadrangular frame components, each comprising two cross-carrier members of neighboring cross-carrier triangles and two longitudinal beams interconnecting the cross-carrier members, thereby enclosing quadrangular surfaces. These quadrangular surfaces are strengthened by two diagonally extending tensioning elements. A lift gas cell is arranged int eh longitudinal frame sections. Each lift gas cell bears with its upper portion against the inner surface of the longitudinal carrier beam to which it is secured. Each lift gas cell projects laterally from the cross-carrier ribs and the longitudinal carrier beams so that these cells form with their cell skin over the length of the respective longitudinal frame section, the envelope of the lift gas cell and the outer skin of the airship. The lower portion of the lift gas cell loosely rests on the tension elements diagonally crossing the quadrangular surface formed by the two lower base longitudinal carrier beams, whereby the lower portion of the respective lift gas cell forms a separation wall between the gas in the lift or carrier gas cell and an air chamber provided in the lower portion of the airship. A separate envelope is arranged between the base longitudinal carriers to downwardly close said air chamber, whereby the envelope completes or supplements the cross-sectional configuration of the airship.

The just described structure of the carrier frame according to the invention makes it possible to secure three components of a tail unit to the ends of the the three longitudinal carrier beams. It is further possible in the present structure that the propulsion plants which are secured tot he two lower longitudinal carrier beams, can be positioned within a substantially freely selectable range since the anchoring connectors may be secured to the junction points of the carrier frame.

Another advantage of the invention is seen in that the construction of the triangular shaped cross-carriers or cross-ribs in combination with the longitudinal carrier beams require few simple structural components, whereby manufacturing costs are lowered to an optimal extent. Individual components such as the longitudinal or cross-beams may be conveniently premanufactured and then separately assembled. The entire ship has a low total weight, whereby a high payload and hence efficiency is achieved. Due to the diagonal tensioning of the quadrangular fields or surfaces, the present carrier frame has a high stiffness. As mentioned, the quadrangular surfaces are defined by the longitudinal sections of the carrier beam arranged between neighboring crossbeams formed as triangles, the base of which faces down. The stable and elongated aerodynamically advantageous shape of the carrier frame makes it possible to secure all structural components to the carrier frame, such components including propulsion plants, control surfaces, gondolas, and so forth.

Stress is released from the trusswork of the carrier frame by the internal pressure to which the outer skin is exposed. This feature additionally improves the strength characteristics of the airship according to the invention, especially with regard to the buckling strength, the bending strength, and the torsion strength. By arranging an air chamber in the lower portion or section of the airship body it is possible to place the base of the carrier frame into an inner portion of the outer skin, whereby protection against damage is provided. For example, when a hard landing is made the gondola can move into the air chamber in an elastic manner before carrier frame components can cause damage to persons in the gondola.

The carrier or lift gas cells are secured in the longitudinal direction of the airship to the outer beams extending in parallel to each other and forming the longitudinal beam members of the carrier frame. The beams themselves are advantageously formed as a trusswork. The outer flange or chord of such trusswork members may be curved in the individual sections of the framework, whereby the curvature corresponds to the outer longitudinal vaulting of the airship. Since the outer skin of the lift gas cells which are arranged in a row in the longitudinal direction also forms the outer envelope of the airship, and since a separate airship envelope outside the carrier construction is not provided at a spacing from the carrier gas cells, the entire airship volume is optimally utilized for containing the lift producing gas volume. It has been found that the gain in lift is about 6% compared to a conventional rigid airship of the same size or volume.

The carrier or lift gas cells contribute to the stiffening of the carrier frame due to the internal pressure inside these gas cells. Even if there should be a pressure loss, the airship retains its configuration and hence remains fully steerable by the control surfaces of the tail unit. Another advantage is seen in that due to the circular outer configuration of the carrier gas cells in the area of the base longitudinal carriers, the airship retains a circular cross-section and the conventional polygonal cross-sectional shape is avoided.

Due to the cooperation of the carrier frame according to the invention with the construction of the carrier gas cells according to the invention, the disadvantages mentioned above with regard to the prior art have been avoided while obtaining for a relatively small airship volume the advantageous characteristics of a larger rigid airship.

BRIEF DESCRIPTION OF THE DRAWINGS

In order that the invention may be clearly understood, it will now be described, by way of example, with reference to the accompanying drawings, wherein:

FIG. 4b is a sectional view along section line C—C in FIG. 4a;

FIG. 5a shows, on an enlarged scale, the detail in the circle Va in FIG. 4a;

FIG. 5b shows, on an enlarged scale, the detail Vb in FIG. 4b;

FIG. 7a shows a side view of a longitudinal frame member constructed as a truss member;

FIG. 7b is a sectional view along section plane E—E in FIG. 7a;

FIG. 7c is a sectional view along section plane F—F in FIG. 7a;

FIG. 8a is a schematic side view of an airship according to the invention showing the normal position of the propulsion engines and the gondola;

FIG. 8b is a sectional view along section line A—A in FIG. 8a;

FIG. 8c is a view similar to that of FIG. 8a showing an emergency position of the gondola partly elastically recessed into the air space of the airship;

FIG. 8d is a sectional view along section line B—B in FIG. 8a showing the gondola in its normal position;

FIG. 8e is a view similar to FIG. 8d, but showing the gondola in its recessed emergency position;

FIG. 9b is a sectional view along section line 9b-9b in FIG. 9a.

DETAILED DESCRIPTION OF PREFERRED EXAMPLE EMBODIMENTS AND OF THE BEST MODE OF THE INVENTION

Figure 1:
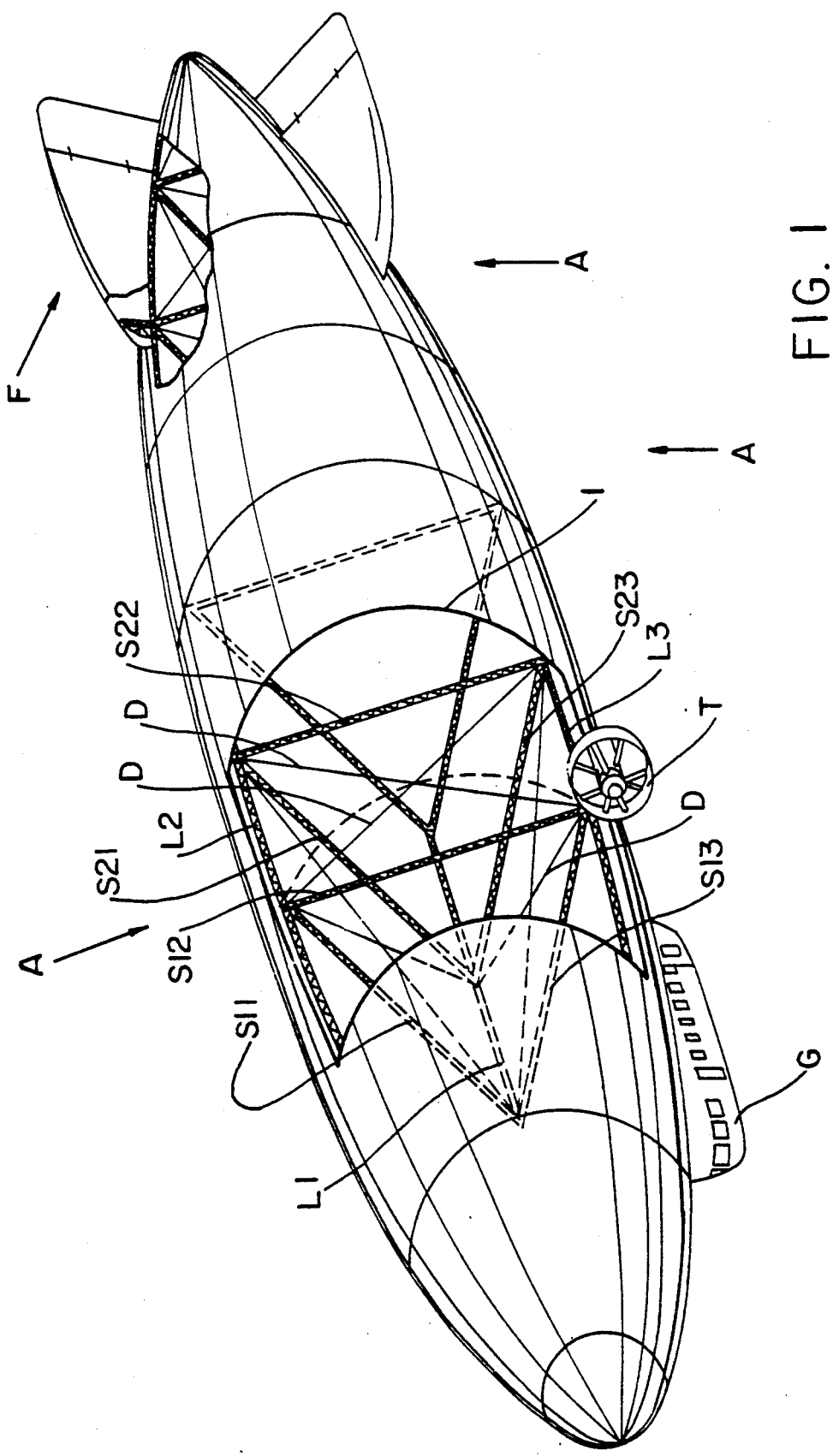
FIG. 1 shows a perspective view of an airship according to the invention, whereby the outer skin or envelope has been partially removed to reveal the frame structure according to the invention.

The perspective view of FIG. 1 showing an airship according to the invention, illustrates the assembly of the entire rigid carrier frame using triangle ribs and longitudinal beams to form frame sections A. In the central portion of FIG. 1, the outer skin or envelope has been removed to illustrate the internal structure and arrangement of the carrier frame. The cross-ribs of the frame are constructed as triangular cross-beams having preferably the shape of an isosceles triangle. Each triangular cross-beam has two equal sides and a base facing down. The first cross-beam visible in FIG. 1 has two equal sides S11 and S12 and a base S13. The axially spaced next triangle has two equal sides S21 and S22 and a base S23. The two neighboring triangular cross-beams just described are spaced from each other by the axial length of a frame section A. The tips of the triangular cross-beams point upwardly. The basis of all triangles, namely S13, S23 and so forth, extend horizontally and form the lower base of the carrier frame. To form a frame section A two neighboring triangular cross-beams are interconnected by longitudinal beams L1, L2, and L3 interconnecting respective corners of the two neighboring triangular beams. As a result, each frame section has a prismatic shape with three quadrangular surfaces, one of which faces downwardly forming the base of the carrier frame and the two other surfaces slant laterally downwardly to form the sloping side surfaces of the prism. The base surface in a front section of the airship is, for example, bounded by the base beam member S13 and S23, and by the longitudinal beam members L1 and L3. A lateral surface of the prism is, for example, bounded by the beam members S12 and S22, as well as L2 and L3. As is shown in the drawing, the just mentioned plane quadrangular surfaces are the location of reinforcing tension wires or elements D extending diagonally from corner to corner. These diagonal tension elements D may be flexible and can, for example, be formed by tension wires or cables cooperating with an adjusting mechanism, for example, a turnbuckle 8 forming a connector. The double diagonal tensioning improves substantially the strength of the carrier frame and constitutes an advantageous development compared to the above mentioned conventional triangular cross-ribs with their tips pointing down. Viewing several longitudinal frame sections A in conjunction, it is clear from FIG. 1 how the longitudinal carrier frame is constructed with the longitudinal beam members L1, L2, L3 interconnecting the triangular ribs. By interconnecting the longitudinal beam members in series with one another continuous longitudinal beams are formed. The base of the carrier frame formed by the longitudinal beam members L1, L3 are ideally suited for supporting components of the airship, such as the propulsion engines. Especially the junction points where the longitudinal beam members are joined to the cross-beam members are suitable for the mounting of the engines. The control tail unit F and the suspension of the gondola G will be described in more detail below.

Figure 2A:
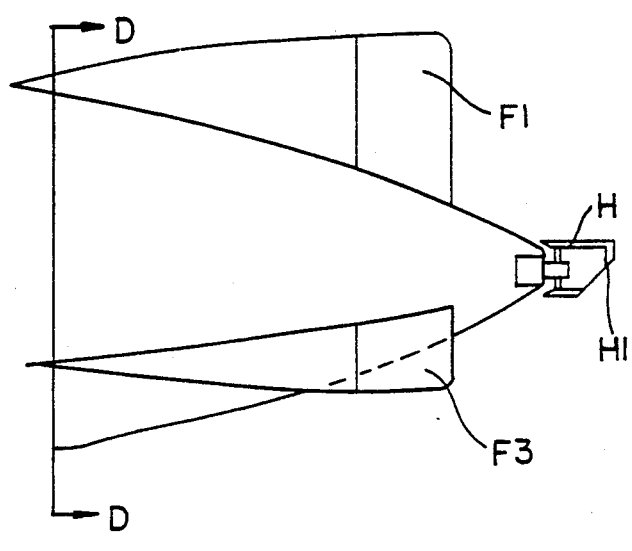
FIG. 2a is a side view onto the tail unit shown in FIG. 1.
Figure 2B:
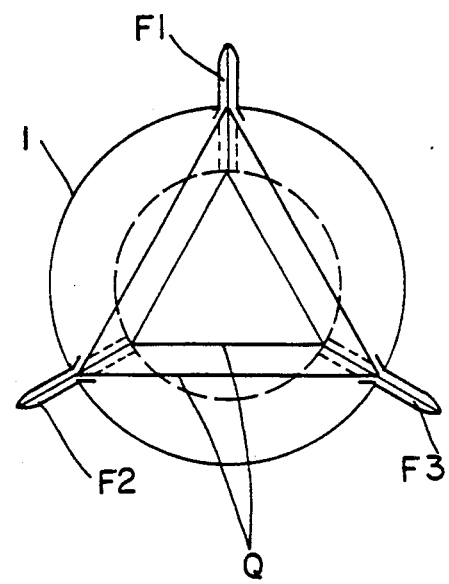
FIG. 2b is a sectional view along the section line D—D in FIG. 2A.

FIGS. 2a and 2b show a simplified illustration of the tail section of an airship according to the invention, whereby FIG. 2b is a sectional view along section line D—D in FIG. 2a. The fins F1, F2, and F3 of the control tail unit are advantageously secured to the rear ends of the three longitudinal carrier beams L1, L2, and L3. This three component tail unit with its fins F1, F2, and F3 has an inverted Y-configuration. FIG. 2a shows a separate tail engine H including a jet deflector H1. By deflecting the jet more or less downwardly or, if necessary, also to one side or the other, more or less, an advantageous additional control of the airship is provided during hovering flight. This additional jet directional control efficiently supplements the aerodynamic control provided by the fins and rudder, especially during the mentioned hovering flight when the rudder is not very effective due to the low hovering speed. FIG. 2b also indicates two triangular cross-ribs Q as well as the external skin or envelope 1 of the airship having a circular cross-section.

Figure 2C:
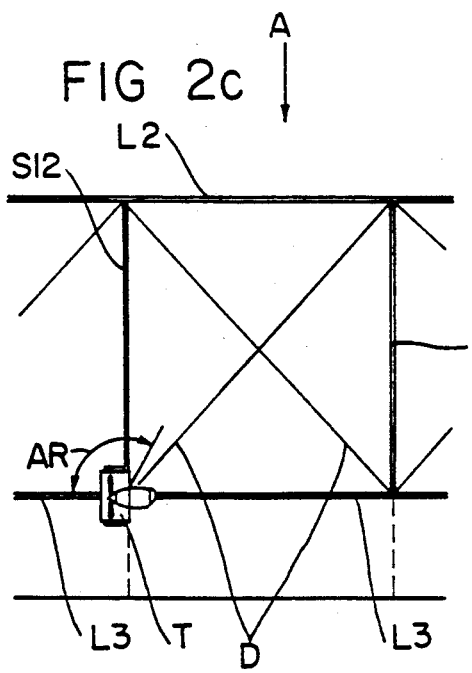
FIG. 2c shows a trusswork detail viewed in a direction perpendicularly and horizontally to the longitudinal axis of the airship.

FIG. 2c shows two neighboring cross-ribs or cross-beams with the respective cross-beam members S12 and S22 interconnected by longitudinal beam members L2 and L3 forming a rectangular configuration. The location of the diagonal tensioning members D is evident from FIG. 2C showing that the tensioning members D are positioned in one lateral surface of each prism. An engine T is mounted to the junction point formed by the beam members S12, L3, and L3'. The double arrow AR indicates the tilting range of the engine T.

Figure 2D:
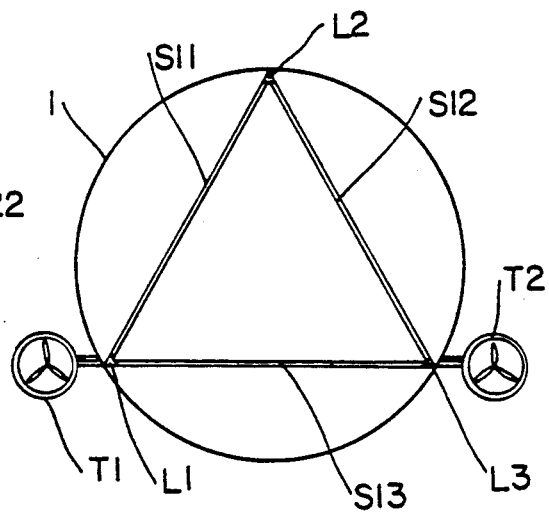
FIG. 2d is a sectional view perpendicularly to the longitudinal airship axis in a plane passing through the airship upstream of the propulsion engines.

FIG. 2d shows a cross-rib comprising the above mentioned rib members S11 and S12 forming isoceles sides of the triangle and the rib or cross-beam member S13 forming the base. The longitudinal beam members L1, L2, and L3 extend perpendicularly to the plane of the drawing. A circle 1' indicates the outer skin on envelope 1 or envelope of the airship. The skin 1 encloses the carrier gas cells 1'. Two engines T1 and T2 are mounted to the junction points where the base member S13 of the triangle is joined to the longitudinal beam members L1 and L3. It is important for the construction of the cross-ribs as triangular beams, that the lateral beam members S11 and S12 are triangle sides of equal length. Moreover, the length of the base member S13 is less critical. However, it is advantageous for a symmetrical construction that all three beam members S11, S12 and S13 have the same length to form an equi-lateral triangle.

Figure 3:
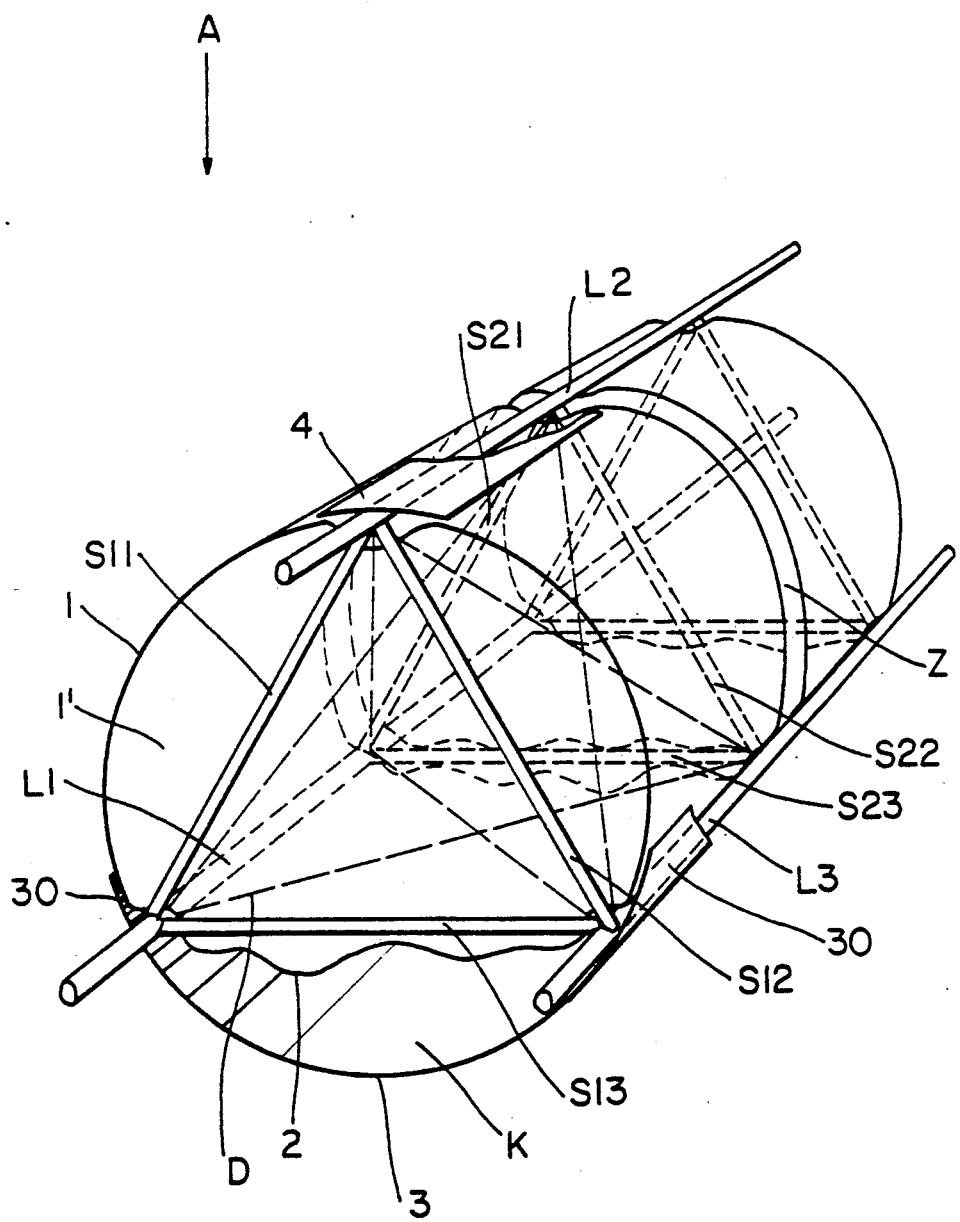
FIG. 3 illustrates a perspective view of one longitudinal section of the carrier frame partially in section.

FIG. 3 shows one complete longitudinal section A in a perspective view as part of the carrier frame of the airship. As mentioned, the first cross-rib comprises the cross-beam members S11, S12, and S13 and the second cross-beam comprises the beam members S21, S22, and S23. The cross-beams extend in parallel to each other at a spacing determined by the longitudinal beam members L1, L2, and L3 extending in parallel to the central longitudinal axis of the airship while the triangular cross-beams extend perpendicularly to the longitudinal ship axis.

A lift gas cell 1' has an upper portion with a circular cross-section between the longitudinal beams L1 past the longitudinal beam L2 to the other lower longitudinal beam L3. The skin of the lift gas cell 1' bears against the inner surfaces of the three longitudinal beam members. Outside the beam members, the skin of the gas cell 1' bulges outwardly to an extent corresponding approximately to the respective radial dimension of the beam members or even somewhat more so that the beam members L1, L2 are located in a ditch or groove formed by the skin of the gas cell around the beam members. A downwardly facing section of the lift gas cell 1' between the longitudinal beam members L1 and L3 rests on the one hand on the diagonal tensioning members D in the surface defined by the beam members L1, L3, S13, and S23. In the surface areas outside the just mentioned frame components and outside the diagonal tensioning members, the gas cell may bulge downwardly with its lower skin section 2 as best seen in FIG. 3. This lower wall section 2 separates the gas cell 1' from an air chamber K arranged in the lift downwardly facing belly portion of the airship below the carrier frame. The air chamber K is enclosed by a skin section 3 forming part of the skin of the airship. The remaining skin of the airship is formed by the skin 1 of the gas cells except where the cross-ribs and the longitudinal beam members are located which are covered by cover strips, edges or tape. For this purpose, the edges 30 of the belly skin 3 are pulled up above the longitudinal beam members L1 and L3 to cover these beam members in a gas-tight manner. In addition to the gas-tight connection of the edges 30 to the skin 1 of the gas cells 1' to cover the beams L1, L3, the edges 30 make sure that the longitudinal beam members are completely enclosed. A cover tape or strip 4 covers the groove or ditch in which the upper longitudinal beam member L2 is located. The strip or tape 4 again must be connected in a gas-tight manner to the neighboring skin areas 1 of the gas cells 1'. Further details of the cover tape 4 will be described below. One carrier gas cell 1' is arranged between neighboring cross-ribs. Specifically, one cell 1' is located between the cross-beam members S11, S12, and S13 on the one hand and the cross-beam members S21, S22, S23 on the other hand. The next gas cell is located between the beam members S21, S22, and S23 on the one hand and the next following triangle in the frame structure. Thus, two neighboring carrier gas cells are separated from each other by a triangular cross-beam, whereby the cross-beam is located in the space Z which communicates with the air chamber K. The intermediate space Z is also covered in a gas-tight manner by tapes similar to the cover tape 4 and to the edges 30. The circumferential tape may extend entirely around the airship so as to cover any seams between neighboring skin sections 3 which cover the airship's belly.

Figure 4A:
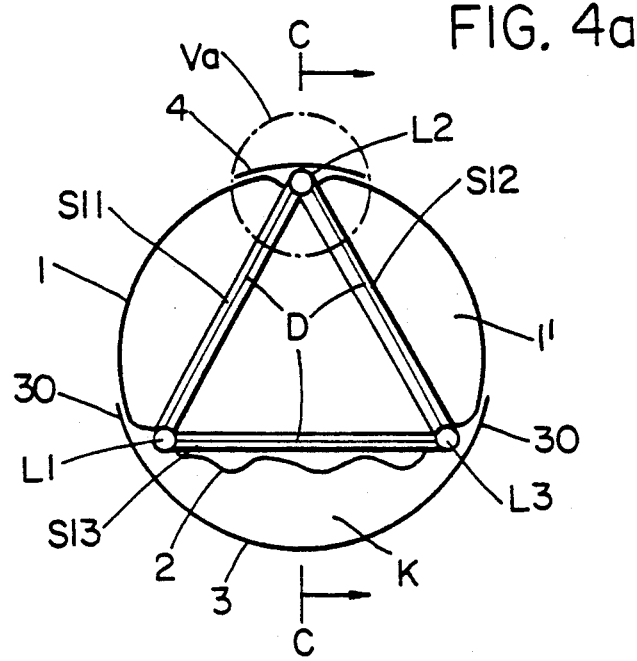
FIG. 4a is a sectional view perpendicularly through the longitudinal airship axis.

FIG. 4a shows a simplified cross-section passing through a triangular cross-beam, thus illustrating the location of the cross-beam members S11, S12, and S13, as well as the longitudinal beam members L1, L2, and L3, the dash-dotted lines in each of the cross-beam members S11, S12, and S13 indicate the position of the diagonal tensioning members D. The upper portion of the gas-tight envelope 1 of the carrier gas cell 1' which is shown behind the triangular cross-beam forms a circular configuration as mentioned above. The cross-section illustrates especially the bulging of the carrier gas cell skin around the longitudinal carrier beam members L1, L2, and L3. In other words, the gas cell bulges on both sides of the longitudinal beam members so that the resulting groove provides space for the longitudinal beam. The cover strip 4 is, for example, adhesively bonded to the skin 1 of the air cells as is shown in more detail in FIG. 5a showing, on an enlarged scale, that portion of FIG. 4a encircled by a dash-dotted line Va. The above mentioned air chamber K is located below the base cross-beam member S13, and the downwardly facing wall 2 also bulges downwardly outside the base beam member S13 as indicated at 2. The air filling in the air chamber K is indicated by dots.

Figure 4B:
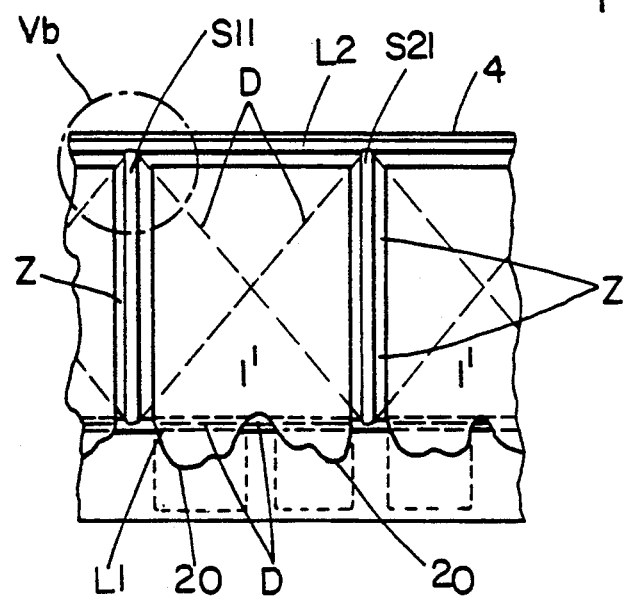

FIG. 4b illustrates, on a somewhat enlarged scale compared to FIG. 4a, a sectional view along section line C—C in FIG. 4a to show the diagonal tensioning members D. The downwardly facing skin 2 of the carrier or lift gas cells 1' form sacks 20 that bulge through the spaces between the tensioning members D facing downwardly, whereby these sacks penetrate into the air chamber K. The cooperation of the carrier gas cells 1' with the air chambers K is conventional and hence will not be described in more detail in conjunction with the present invention. The downwardly bulging sacks 20 will penetrate deeper into the air chamber K as shown by dash-dotted lines in FIG. 4b when there is a low air pressure in the chambers K. FIG. 4b also illustrates the disk type intermediate spaces Z between two neighboring gas carrier or lift cells 1'. The cross-beam members S11 and S21 are located in these intermediate spaces Z.

Although the downwardly facing skin or envelope portion 2 of the carrier gas cells 1' bulge downwardly and rest on the lower diagonal tensioning members, the lateral diagonal tensioning members penetrate through the walls, or rather through the skin of the carrier gas cells 1' as will be described in more detail below with reference to FIG. 5b. This penetration of the lateral diagonal tensioning members D through the skin 1 of the carrier or lift gas cell 1' is located near the connection of the carrier gas cell to the longitudinal beam members.

FIG. 5a shows on an enlarged scale the portion encircled by a dash-dotted line in FIG. 4a, whereby the cross-beam members S11 and S12 are shown cut-off and the longitudinal beam member L2 extends perpendicularly to the plane of the drawing. The longitudinal carrier beam member L2 rests in the above mentioned ditch or groove 1" formed by a portion of the skin 1 of the carrier gas cell 1'. The longitudinal carrier beam L2 is provided along its entire length at its upwardly facing side with mounting flanges 25 projecting to both sides of the beam L2. The mounting flanges 25 in turn are secured to skin extension edges 40 of the airship skin 1 which may simultaneously be the outer skin of the carrier gas cells 1'. Lashing elements 5 are interposed between the mounting flanges 25 and the skin edges 40 to tightly lash the skin edges 40 to the flanges 25. A gas tight cover tape or strip 4 is secured in a gas-tight manner to the edges 40, for example by an adhesive 40'. Instead of an adhesive, a gas-tight seam may be formed, for example, by sewing or welding or the like. Even a hook and loop (Velcro ®) may be sufficiently gas-tight. The cover tape or strip 4 covers the ditch or groove formed by the skin portion 1" including the skin edges 40 and the lashing elements 5. FIG. 5b shows on an enlarged scale, portion Vb from FIG. 4b, whereby the longitudinal section of FIG. 5b does not pass exactly through the center of the longitudinal beam member L2, but in front of it in order to show the junction construction between the beam members S11 and L2 and also illustrating the connection of the diagonal tensioning members D. A turnbuckle type connector 8 secures one end of the respective tensioning member D to a lug 8', whereby the tensioning member can be individually tensioned by turning the turnbuckle. A gas-tight nipple type connector 7 forms a gas-tight inlet through the skin 1 of the respective carrier gas cell 1'. The connector 7 may, for example, be formed as an elastic bellows that permits the sliding movement of the tensioning member D through the wall of the respective carrier lift gas cell 1'. A further cover strip or tap 4' extends circumferentially around the airship for closing the gap formed between neighboring carrier gas cells 1' where the cross-ribs S11, S12, and S13 are located.

Figure 6A:
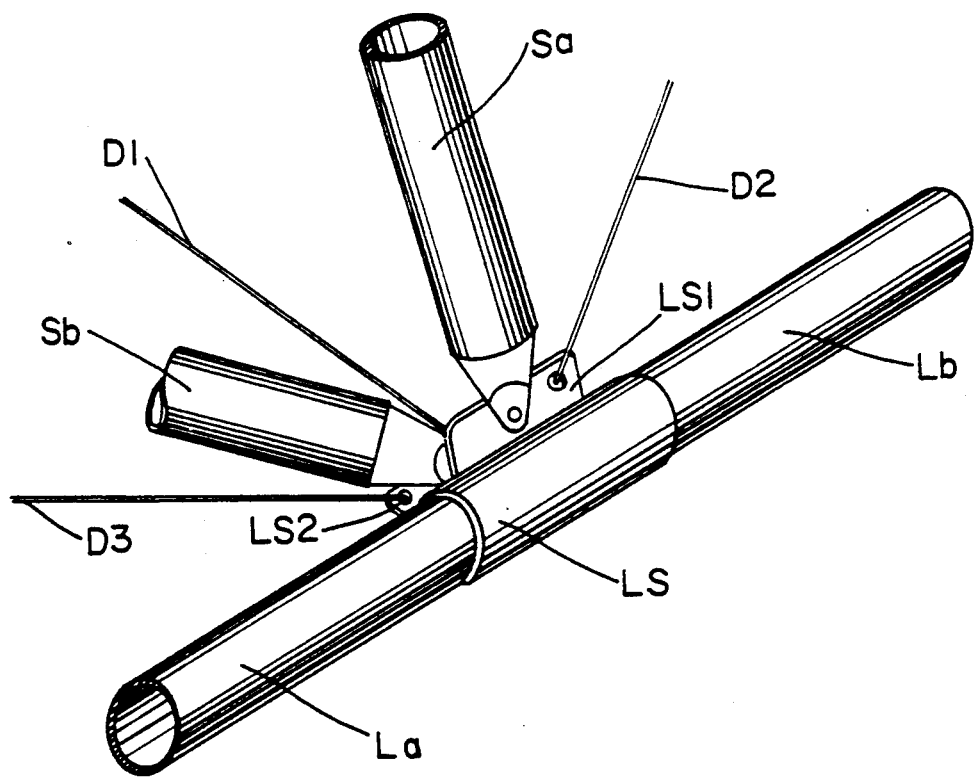
FIG. 6a shows a perspective view of a junction construction between tubular frame members.

FIG. 6a illustrates in a simplified manner a junction coupling between two longitudinal beam sections La and Lb with each other and with two cross-beam members Sa and Sb, whereby all beam members are of tubular construction. However, the frame members may also be of a truss construction to be described below. A tubular coupling sleeve LS receives axially the two longitudinal beam members La and Lb. The coupling sleeve LS has two radially and axially extending outer flanges LS1 and LS2. The cross-beam member Sa is secured to the flange LS1. The ends of the lateral tensioning members D1 and D2 are also connected to the flange LS1. The horizontally extending base cross-beam member Sb is connected to the flange LS2. Similarly, the horizontally extending tensioning member D3 is connected to the flange LS2. The fourth horizontal tensioning member is not visible in FIG. 6a, because it is behind the cross-beam member Sa.

Figure 6B:
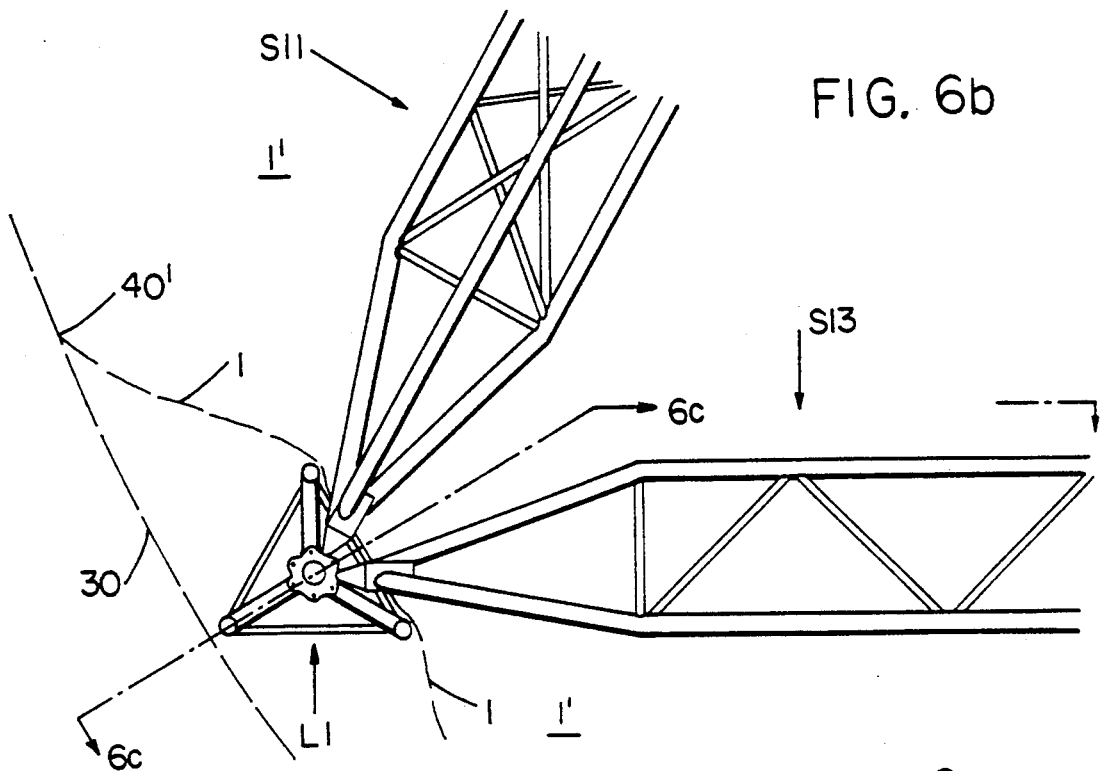
FIG. 6b shows a junction construction between truss-type frame members, whereby the view extends in the direction of the longitudinal airship axis.

FIG. 6b illustrates a view partially in section, onto a junction point between longitudinal and cross-frame members, each of which is made as a truss construction. The outer cover tape or strip 30 which covers the longitudinal beam member L1 is shown as a dashed line merging onto the outer skin of the carrier gas cell 1', whereby the connection at 40' may be the same as described above with reference to FIG. 5a. Each of the carrier beams has a pointed end that merges into the junction point as shown in FIG. 6b.

Figure 6C:
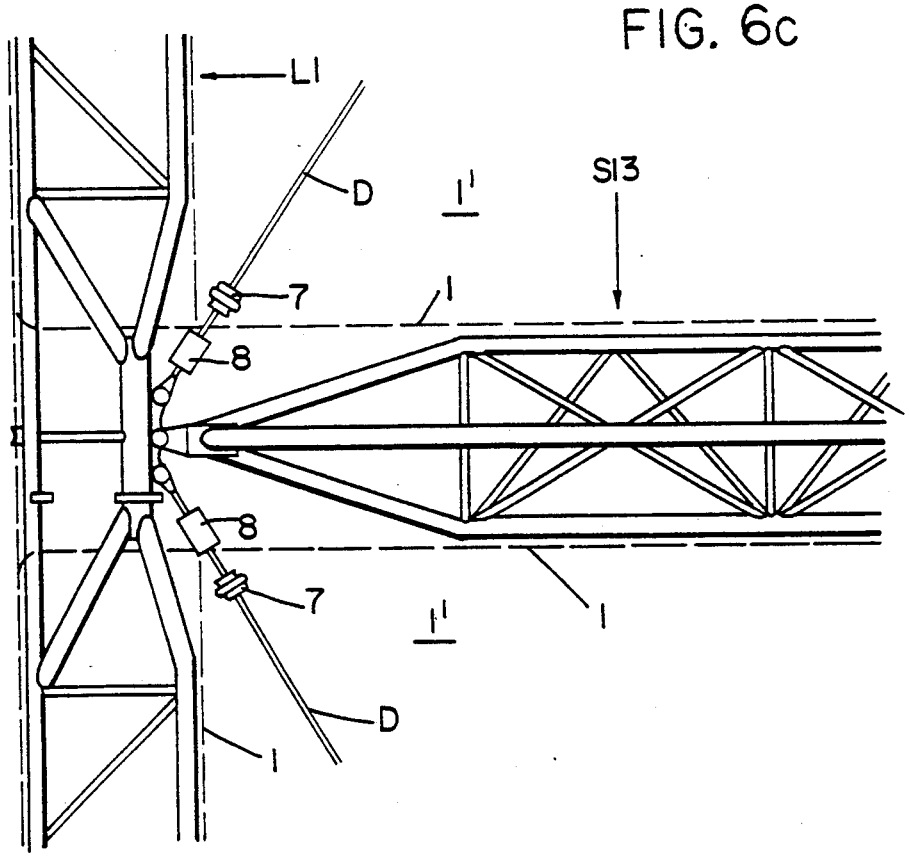
FIG. 6c shows the junction construction of FIG. 6b, however in a plan view 6c-6c omitting the upwardly directed frame member of the triangular rib; of a longitudinal frame member

FIG. 6c shows a view in the direction of the section plane 6c—6c in FIG. 6b. The diagonal tensioning members D are again connected to the junction point through a turnbuckle 8, for example, and through the gas-tight connector 7 passing through the skin 1 of the respective carrier or lift gas cell 1'.

FIG. 7a illustrates a truss construction for a longitudinal beam member L. Each longitudinal truss member is constructed in accordance with the flow dynamic requirements. For this purpose, the radially inner flange 9a of the truss is straight, while the radially outer flange 9b of the truss is curved so that it conforms to the respective outer curvature of the airship at the particular location within the airship body where the longitudinal beam member is used. FIGS. 7b and 7c show that along its length the longitudinal beam member L1 has different radial heights H1, H2.

FIG. 8a shows a schematic side view of an airship according to the invention having, for example, a nose tip NT and nine longitudinal frame sections A separated by eight cross-beams or cross-ribs Q1, Q2, Q3, Q4 and so forth. A longitudinal section A is defined between two neighboring cross-beams or ribs. Due to the described arrangement of the diagonal tensioning elements D in combination with the triangular cross-ribs and the longitudinal beam members at the three corners of the triangle, the invention achieves a high strength frame structure to which the tail unit with its fins F is secured as will be described in more detail below. A tail propulsion engine H is secured to the very end of the tail for steering purposes by means of a thrust vector produced by a jet of the engine H. Along the belly and below the base B there are one or more air chambers K. A gondola G is suspended by truss members or cables 15, 16 secured to the cross-beams or ribs Q1 to Q4. The suspension of the gondola G may, for example, comprise damping members such as piston cylinder devices or the like indicated at 17 in FIG. 8d.

FIG. 8b also shows the connection of the two engines T to the frame structure at a junction point between the cross-rib Q4 and the respective longitudinal beam members. Anchoring devices such as hooks and eyelets not shown may also be connected to the carrier frame structure for securing the airship on the ground.

FIG. 8a shows the gondola G in its normal position while FIG. 8c shows the gondola after a hard landing, whereby the gondola G has moved elastically into the space of the air chambers K. This elastically recessed position of the gondola G in the air chamber K is also illustrated in FIG. 8e. This feature of the invention greatly reduces damages to the gondola and injury to persons.

With regard to the construction of the air chamber K it should be mentioned that the air chamber can be subdivided in any suitable manner to form a plurality of individual air chambers, but a single air chamber extending along the entire length of the airship may be practical. However, a plurality of air chambers, for example, corresponding to the number of carrier or lift gas cells or a smaller number of air chambers may be suitable. For example, one air chamber can be arranged below two carrier or lift gas cells. In any event, each air chamber will be provided with a venting valve V as shown in FIG. 8a. The venting valve V is an excess pressure responsive valve and controls the air pressure within its air chamber K in accordance with operational requirements. In FIG. 8a it is, for example, assumed that the front section of the airship including the cross-ribs Q1 to Q4 has a common air chamber K and that the rear section of the airship has a separate second air chamber. The front air chamber is equipped with its own ventilator or venting valve V′ while the rear section is provided with the ventilator or valve V. It is possible that instead of the venting valves an air pressure device could be used for assuring the required excess pressure in the air chambers.

Figure 9A:
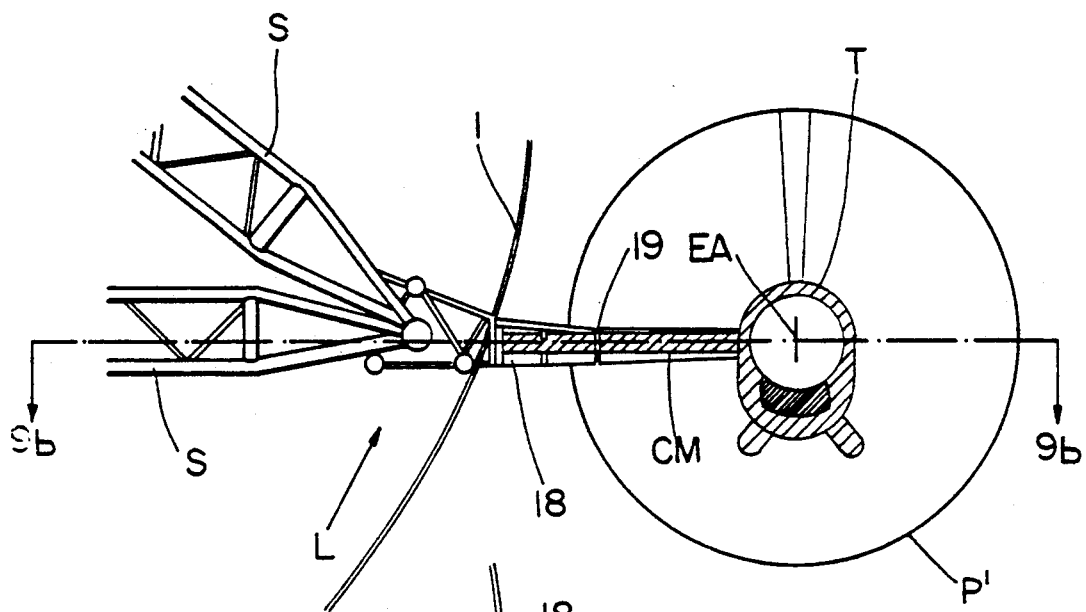
FIG. 9a is a sectional view perpendicularly through the longitudinal airship axis to illustrate the mounting of an engine.
Figure 9B:
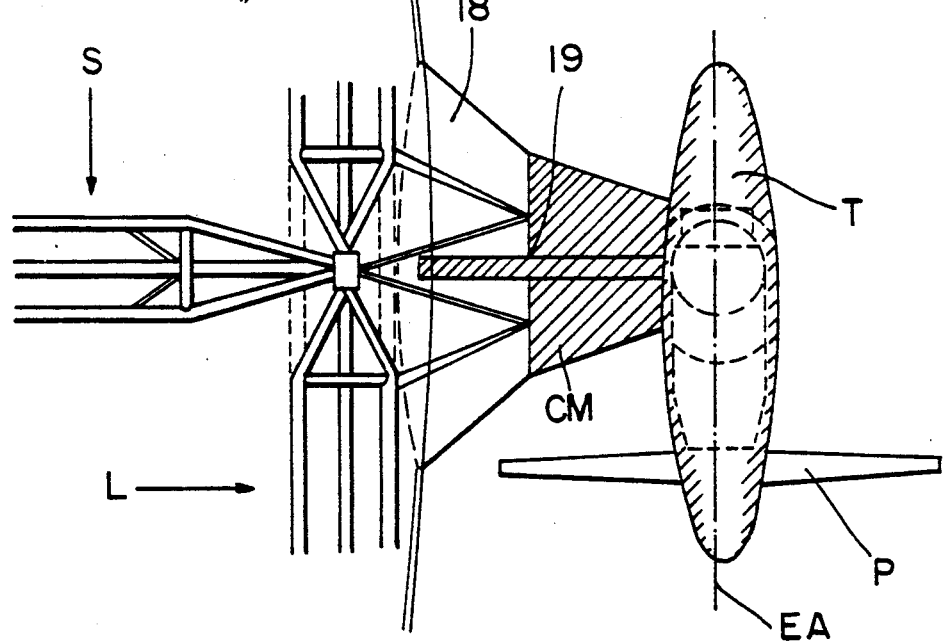

FIGS. 9a and 9b show details of the mounting for an engine T to a junction point formed between the members S of the cross-rib and the longitudinal beam sections L. A pilon 18 is secured at one end to the junction point and through a tiltable bearing 19 at the other end to a carrier member CM connecting to the housing of the engine T which may, for example, be a turbine driven propeller engine. With the aid of the tilting bearing 19 it is possible to change the orientation of the longitudinal engine axis EA relative to the longitudinal central axis of the airship so that the engine jet is directed somewhat downwardly, please also see the tilting arrow AR in FIG. 2c. FIG. 9b shows a sectional view approximately along section plane 9b-9b in FIG. 9a, whereby the propeller P is tilted in a position for forward movement. The propeller circle P′ is seen in FIG. 9a.

Although the invention has been described with reference to specific example embodiments, it will be appreciated that it is intended to cover all modifications and equivalents within the scope of the appended claims.

What is claimed is:

1. A rigid airship comprising a carrier frame including longitudinal beams and a plurality of triangular cross-ribs each having a base arranged horizontally in a lower option of said carrier frame, means forming junctions between said triangular cross-ribs and said longitudinal beams at corners of said cross-ribs to form quadrangular frame components each comprising two cross-ribs and two longitudinal beams interconnecting said two cross-ribs, thereby enclosing quadrangular surfaces, diagonally extending tension elements in said quadrangular frame components, whereby three of said quadrangular frame components form a longitudinal frame section lift gas cell means arranged in said longitudinal frame sections between triangular cross-ribs, each lift gas cell means bearing with an outer portion against an inner surface of the respective longitudinal beams to which said lift gas cell means is secured, each lift gas cell means having a cell skin projecting laterally from the cross-ribs and from the longitudinal carrier beams so that said lift gas cell means form with their cell skin an outer skin of said rigid airship over the length of the respective longitudinal frame section, said lift gas cell means having a lower portion loosely resting on said tension elements diagonally crossing said quadrangular surface formed by two lower base longitudinal beams and two triangular bases, whereby a lower portion of the respective lift gas cell mean forms a separation wall between gas in said lift gas cell means and at least one air chamber formed in a lower belly portion of said airship, and a separate envelope portion arranged between said base longitudinal beams to downwardly close said at least one air chamber, whereby said envelope portion completely encloses the surface of said lower belly portion of said airship while said cell skin of said lift gas cell means encloses the remaining surface of said airship.

2. The airship of claim 1, comprising a three component control tail unit including fins secured to ends of three longitudinal beams.

3. The airship of claim 1, wherein said cross-ribs are constructed as isoceles triangles having a base facing down and a tip formed by triangle sides of equal length, facing up.

4. The airship of claim 1, wherein said cross-ribs and said longitudinal beams are constructed as a trusswork.

5. The airship of claim 4, wherein said longitudinal beams forming part of said trusswork comprise a straight inner flange and a curved outer flange, said curved outer flange having a curvature corresponding to an outer longitudinal contour of the airship.

6. The airship of claim 1, further comprising propulsion engines and means for mounting said propulsion engines to junction points of the base of said carrier frame.

7. The airship according to claim 6, further comprising mounting means for tiltably mounting said engine to said junction point or points.

8. The airship according to claim 1, further comprising a tail engine secured to a tail end of said airship.

9. The airship of claim 1, further comprising anchoring connectors secured to junction points of the base of said carrier frame.

10. The airship of claim 1, wherein said tensioning elements in the longitudinal frame sections pass through the wall of said lift gas cell means arranged in the respective frame section in a gas-tight manner, and further comprising tensioning means for connecting said tensioning elements, said tensioning means being arranged in an air space of said junctions of said carrier frame.

11. The airship of claim 10, wherein a gas-tight bellows is arranged at a point where said tensioning elements pass through said cell skin of said lift gas cell means.

12. The airship of claim 1, wherein a lower skin portion of said lift gas cell means forming a separation wall between lift gas in said lift gas cell means and said at least one air chamber form sack-type bulges which hang downwardly between said tensioning members into said at least one air chamber.

13. The airship of claim 1, comprising a common air chamber for a plurality of lift gas cell means arranged in sequentially positioned carrier frame sections.

14. The airship of claim 1, further comprising means (V, V′) for controlling an air excess pressure required in said at least one air chamber.

15. The airship of claim 1, wherein intermediate spaces between two lift gas cells of said lift gas cell means, which are separated by said cross-ribs, are in communication with said at least one air chamber.

16. The airship of claim 15, further comprising cover strips interconnecting two lift gas cells of said lift gas cell means which are separated from each other by a cross-rib between two frame sections, said cover strips sealing said intermediate space and fully closing the outer skin of the airship in an airtight manner.

17. The airship of claim 1, wherein an apex space in which an upper longitudinal carrier beam of the carrier frame is arranged and which is covered on its sides by an outer skin of the airship, is further covered by an additional strip.

18. The airship of claim 1, wherein a groove formed by said lift gas cell means for holding a longitudinal beam member is covered by border strips of said air chamber envelope portion.

19. The airship of claim 1, further comprising a gondola and means for suspending said gondola from a base portion of said carrier frame so that said gondola can move into said chamber in response to an impact.

20. The airship of claim 19, wherein said means for suspending comprise damping members for damping an impact.

* * * * *

UNITED STATES PATENT AND TRADEMARK OFFICE
CERTIFICATE OF CORRECTION

PATENT NO.  : 5,110,070
DATED       : May 5, 1992
INVENTOR(S) : Klaus Hagenlocher et al.

It is certified that error appears in the above-identified patent and that said Letters Patent is hereby corrected as shown below:

Title Page:
In the Abstract [57], line 3, replace "nectd" by --nected--;
In claim 1, column 11, line 49, replace "option" by --portion--;
            column 11, line 62, replace "beams" by --beam--;
            column 12, line 3,  replace "triangular" by
                                --triangle--.

Signed and Sealed this

Sixth Day of July, 1993

Attest:

MICHAEL K. KIRK

Attesting Officer            Acting Commissioner of Patents and Trademarks